United States Patent
Umamaheswaran et al.

(10) Patent No.: US 8,965,363 B1
(45) Date of Patent: Feb. 24, 2015

(54) CONTROLLING A PREFERRED ROAMING LIST

(75) Inventors: Shoba Umamaheswaran, Overland Park, KS (US); Kyle Trent Ulrey, Olathe, KS (US); Kenneth Michael Kieffer, Jr., Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 385 days.

(21) Appl. No.: 13/488,706

(22) Filed: Jun. 5, 2012

(51) Int. Cl.
*H04M 1/66* (2006.01)
*H04W 4/00* (2009.01)

(52) U.S. Cl.
USPC .............. 455/432.3; 455/411; 455/435.1; 455/435.2; 455/435.3; 455/432.1; 455/432.2; 455/434

(58) Field of Classification Search
CPC ...... H04W 48/16; H04W 48/18; H04W 88/06
USPC ............. 455/411, 435.1–435.3, 432.1–432.3, 455/434
See application file for complete search history.

(56) References Cited

U.S. PATENT DOCUMENTS

| | | | |
|---|---|---|---|
| 6,775,285 B1* | 8/2004 | Moles et al. | 370/392 |
| 7,593,727 B2* | 9/2009 | Zhao et al. | 455/432.1 |
| 7,894,812 B1* | 2/2011 | Durig et al. | 455/432.3 |
| 7,940,726 B2 | 5/2011 | Olsson | |
| 2004/0022216 A1 | 2/2004 | Shi | |
| 2007/0117585 A1* | 5/2007 | Juneja et al. | 455/550.1 |
| 2009/0131017 A1 | 5/2009 | Osborn | |
| 2009/0215452 A1* | 8/2009 | Balasubramanian et al. | 455/434 |
| 2009/0247153 A1* | 10/2009 | Haralson et al. | 455/432.1 |
| 2010/0075669 A1* | 3/2010 | Sparks et al. | 455/433 |
| 2010/0130178 A1* | 5/2010 | Bennett et al. | 455/414.1 |
| 2010/0136960 A1 | 6/2010 | Knezevic | |
| 2010/0309884 A1 | 12/2010 | Haverty | |
| 2010/0311468 A1* | 12/2010 | Shi et al. | 455/558 |
| 2011/0044253 A1* | 2/2011 | Zisimopoulos | 370/328 |
| 2011/0188376 A1 | 8/2011 | Stupar | |
| 2011/0217977 A1* | 9/2011 | Du et al. | 455/432.1 |
| 2011/0317571 A1 | 12/2011 | Kokkinen | |
| 2012/0071165 A1 | 3/2012 | Pampu | |
| 2013/0034019 A1* | 2/2013 | Mustajarvi | 370/254 |

* cited by examiner

*Primary Examiner* — Dung Hong

(57) ABSTRACT

A computer-implemented method, system, and computer-readable storage media for controlling channel access to a mobile device are described. Based upon a configuration being initiated for the mobile device, a preferred roaming list (PRL) on the mobile device is compared to a stored PRL for the mobile device. A channel access to the mobile device is denied when the PRL on the mobile device does not match the stored PRL. A channel is assigned to the mobile device when the PRL on the mobile device matches the stored PRL.

16 Claims, 5 Drawing Sheets

CONTROLLING A PREFERRED ROAMING LIST

SUMMARY

Embodiments of the invention are defined by the claims below. A high-level overview of various embodiments of the invention is provided to introduce a summary of the systems, methods, and media that are further described in the detailed description section. This summary is neither intended to identify key features or essential features of the claimed subject matter, nor is it intended to be used as an aid in isolation to determine the scope of the claimed subject matter.

In an embodiment of the invention, a computer-implemented method of controlling channel access to a mobile device is described. Based upon a configuration being initiated for the mobile device, a preferred roaming list (PRL) on the mobile device is compared to a stored PRL for the mobile device. A channel access of the mobile device is denied when the PRL on the mobile device does not match the stored PRL. A channel is assigned to the mobile device when the PRL on the mobile device matches the stored PRL. One or more computer-readable storage media storing computer-readable instructions thereon, that when executed by a computing device, perform the above-described method of controlling channel access to an unauthorized mobile device is also described.

In another embodiment of the invention, a communications system for controlling mobile device channel access is described. The communications system comprises a mobile device having a preferred roaming list (PRL) stored therein, one or more radio communication equipments, and one or more access networks. The communications system also comprises a core network containing an Access Network Discovery and Selection Function (ANDSF) server and a PRL database. The ANDSF server determines whether the PRL stored within the mobile device matches a corresponding PRL within the PRL database, based upon a comparison of the PRLs, and permitting access to a communication channel in accordance therewith.

In still another embodiment of the invention, a computer-implemented method of regulating a PRL is described. The PRL on a mobile device is scanned. The scanned PRL on the mobile device is compared to a network-stored PRL for the mobile device. The PRL on the mobile device is updated when it differs from the network-stored PRL for the mobile device. One or more computer-readable storage media storing computer-readable instructions thereon, that when executed by a computing device, perform the above-described method of regulating a PRL is also described.

BRIEF DESCRIPTION OF THE SEVERAL VIEWS OF THE DRAWINGS

Illustrative embodiments of the invention are described in detail below, with reference to the attached drawing figures, which are incorporated by reference herein, and wherein.

DETAILED DESCRIPTION

Figure 1:
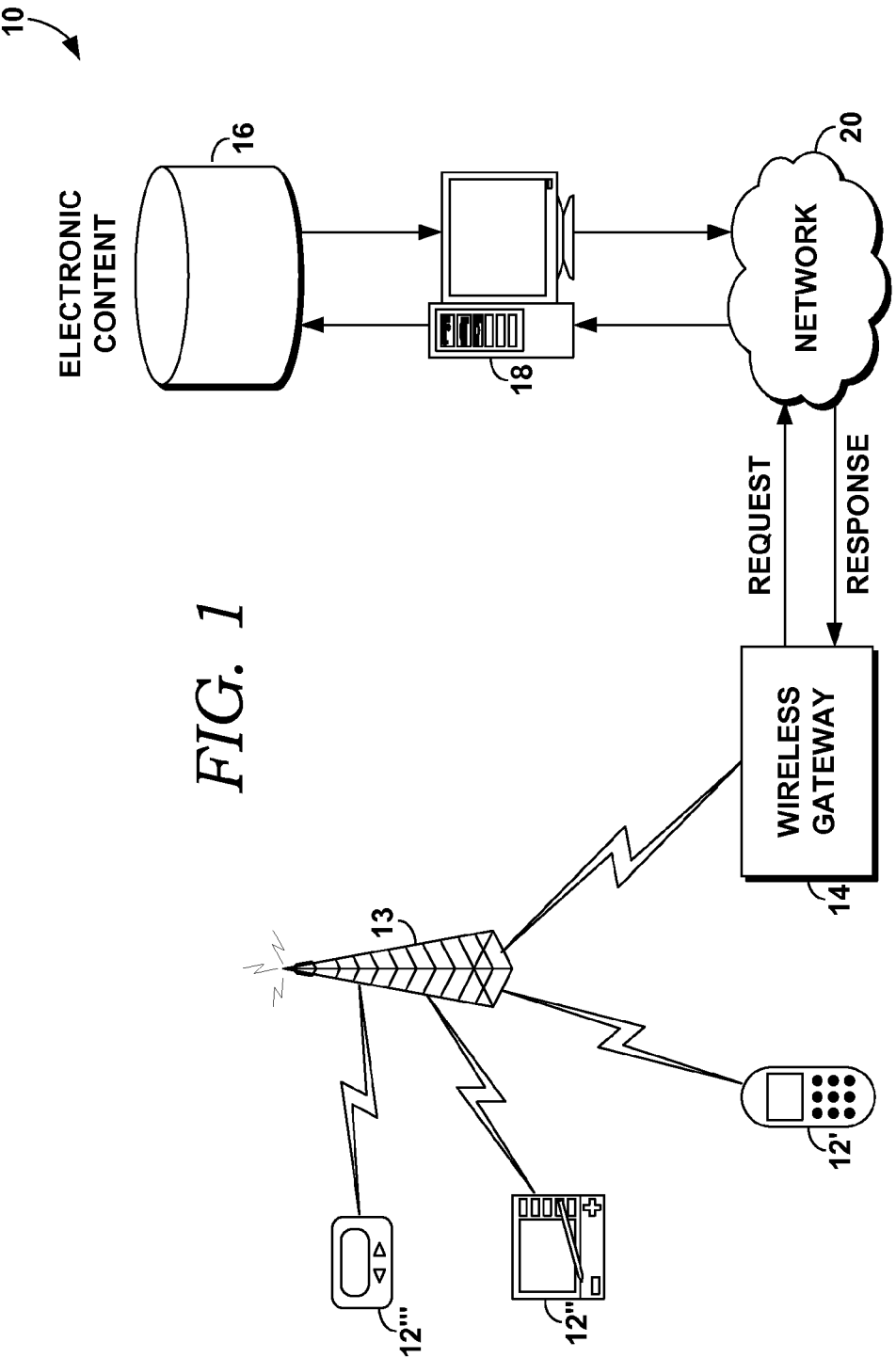
FIG. 1 is a network diagram of an exemplary telecommunications system according to embodiments of the invention.

Embodiments of the invention provide systems, methods, and computer-readable storage media with computer-readable instructions embodied thereon for controlling a preferred roaming list. The terms "step," "block," etc. might be used herein to connote different acts of methods employed, but the terms should not be interpreted as implying any particular order, unless the order of individual steps, blocks, etc. is explicitly described. Likewise, the term "module," "component," etc., might be used herein to connote different components of systems employed, but the terms should not be interpreted as implying any particular order, unless the order of individual modules, components, etc., is explicitly described.

Throughout the description of different embodiments of the invention, several acronyms and shorthand notations are used to aid the understanding of certain concepts pertaining to the associated systems, methods and computer-readable storage media. These acronyms and shorthand notations are intended to help provide an easy methodology for communicating the ideas expressed herein and are not meant to limit the scope of any embodiment of the invention.

Embodiments of the invention include, among other things, a method, system, or set of instructions embodied on one or more computer-readable storage media. Computer-readable storage media include both volatile and nonvolatile media, removable and non-removable media, and media readable by a database and various other network devices. By way of example, and not limitation, computer-readable storage media comprise media implemented in various methods or technologies for storing information. Examples of stored information include computer-useable instructions, data structures, program modules, and other data representations. Media examples include, but are not limited to, information-delivery media, Random Access Memory (RAM), Read Only Memory (ROM), Electronically Erasable Programmable Read Only Memory (EEPROM), flash memory or other memory technology, Compact Disc (CD) ROM, Digital Versatile Discs (DVD), holographic media or other optical disc storage, magnetic cassettes, magnetic tape, magnetic disk storage, and other magnetic storage devices. These technologies can store data momentarily, temporarily, or permanently. The computer-readable storage media include cooperating or interconnected computer-readable storage media, which exist exclusively on a processing system or are distributed among multiple interconnected processing systems that may be local to, or remote from, the processing system. Combinations of any of the above should also be included within the scope of computer-readable storage media.

An operating environment for devices and interfaces used for embodiments of the invention include a processing system with one or more high speed central processing unit(s) (CPU), or other types of processors, a memory component, and a data storage component. The embodiments of the invention are described below with reference to acts and symbolic representations of operations or instructions that are performed by the processing system, unless indicated otherwise. Such acts and operations or instructions are referred to as being computer executed, CPU executed, or processor executed. The memory locations where data bits are maintained are physical locations that have particular electrical, magnetic, optical, or organic properties corresponding to the data bits.

An overview of a telecommunications system will be described, with reference to a network diagram of FIG. 1, which illustrates an exemplary wireless network system 10. Wireless network system 10 includes mobile devices 12, a wireless gateway 14, a database 16 including electronic content, a database server 18, and an information network 20, such as the World Wide Web (WWW). However, none of the embodiments of the invention are limited to these components and more, fewer, or other components can also be used in wireless network system 10. For simplicity, only one wireless gateway 14, database 16, and database server 18 are illustrated in FIG. 1. However, embodiments of the invention also contemplate multiple gateways, databases, and database servers.

The mobile devices 12 include a mobile phone 12', a personal digital assistant (PDA) 12", a one and two-way pager 12''', and other types of mobile devices (not illustrated). Mobile devices 12 may include devices that typically connect using a wireless communications medium such as radio frequency (RF) devices, infrared (IR) devices, or integrated devices combining one or more of the preceding devices. A mobile device, as described herein, refers to any type of wireless phone, handheld device, personal digital assistant (PDA), BlackBerry®, smartphone, digital camera, or other mobile devices capable of communicating wirelessly. One skilled in the art will appreciate that mobile devices will also include a processor and computer-storage media to perform various functions. In embodiments of the invention, computing devices can also refer to devices that are running applications of which images are captured by the camera in a mobile device. A mobile device can also be referred to as user equipment (UE).

The mobile devices 12 encompass a general computing system used in accordance with embodiments of the invention. A mobile device computing system includes a bus that directly or indirectly couples a memory region, one or more processors, one or more presentation components, input/output ports, input/output components, and a power supply. The bus may be representative of one or more busses, such as an address bus, data bus, or any combination thereof.

The information network 20 is configured to allow network connections between a client device and other networked devices, such as database server 18. The information network 20 may be configured to employ a means of communicating information from one computing device to another, such as through a universal serial bus (USB) port, Ethernet link, or any combination thereof. In one embodiment, the information network 20 may be the Internet, or may include local area networks (LANs), wide area networks (WANs), or direct connections.

Information network 20 may further employ a plurality of wireless access technologies including, but not limited to, $2^{nd}$ (2G), $3^{rd}$ (3G), u) and $4^{th}$ (4G) generation radio access for cellular systems, Wireless-LAN, or Wireless Router (WR) mesh. Access technologies such as 2G, 3G, 4G, and future access networks may enable wide area coverage for network devices with various degrees of mobility. For example, the information network 20 may enable a wireless network connection over one of the aforementioned access technologies using a protocol for wireless data transfer such as Global System for Mobile communication (GSM), General Packet Radio Services (GPRS), Enhanced Data GSM Environment (EDGE), and Wideband Code Division Multiple Access (WCDMA).

The wireless gateways 14 can provide a Code Division Multiple Access (CDMA), Wideband CDMA (WCDMA), Time Division-Synchronous CDMA (TD-SCDMA), Advanced Mobile Phone Service (AMPS), Digital AMPS (D-AMPS), Universal Mobile Telecommunications System (UMTS), Radio Frequency (rf), Personal Communication Network (PCN), Global System for Mobile Communications, (GSMC), Worldwide Interoperability for Microwave Access (WiMAX), Generic Packet Radio Services (GPRS), Personal Communications Services (PCS), Cellular Digital Packet Data (CDPD), Wireless Application Protocol (WAP), Digital Audio Broadcasting (DAB), 802.11a, 802.11b, or other types of wireless interfaces for the mobile devices 12. The WAP includes several protocols and standards designed to provide mobile devices with access to electronic content, and it was developed as an alternative to other markup languages and protocols developed for the World Wide Web. One component of the WAP is a Wireless Markup Language (WML), which includes markup tags, and provides control over formatting and layout of electronic content. The WML is often more appropriate to use for mobile devices such as wireless phones than other markup languages such as Hyper Text Markup Language (HTML), etc.

The wireless gateway 14 may be virtually any device that forwards network traffic. Such a device may include, for example, a router, a proxy, a firewall, an access point, a link load balancer, a device that performs network address translation, or any combination of the preceding devices. The wireless gateway 14 may recognize packets that are part of a particular communication protocol or are the same network connection or application session. The wireless gateway 14 may perform special processing on such packets including granting access to a client machine, logging or not logging an event, or network address and port translation.

The database 16 includes electronic content such as text, hypertext, graphical data or references to graphical data images, audio, video, and other content. The electronic content may be stored as a web page or WAP page on a database server, such as server 18. The server 18 can facilitate downloading electronic content from the database 16 to the mobile device 12.

Server 18 includes any computing device capable of establishing or maintaining a network connection with a mobile device. In one embodiment, server 18 is configured to operate as a web server. The server 18 can also operate as a messaging server, File Transfer Protocol (FTP) server, chat server, media server, or online gaming server. In addition, server 18 can be a single component in a larger online application. Devices that can operate as server 18 include, but are not limited to, personal computers, multiprocessor systems, microprocessor-based or programmable consumer electronics, network personal computers, or integrated devices combining one or more of the preceding devices.

A hypertext document includes markup codes called "tags." The structure of hypertext documents is defined by document markup languages such as Hand Held Device Markup Language (HDML), HTML, compact HTML (cHTML), eXtensible Markup Language (XML), WML and Voice eXtensible Markup Language (VoxML), and others. Markup languages also allow references to additional electronic content other than text, including graphics, animation, audio, video, applets, and other electronic data.

Electronic content is displayed on a mobile device 12 with a software application, such as but not limited to a "browser." A browser on a mobile device 12 may be a subset of a larger browser, or a micro-browser. A micro-browser may not be capable of fully displaying content requested from the database server 18. A micro-browser reads electronic content and renders the electronic content into a presentation, such as but not limited to text, graphics, animation, audio, video, etc., for display on the mobile device 12.

Although FIG. 1 illustrates mobile devices 12 in communication with server 18, as can be appreciated, mobile devices 12 can wirelessly communicate with other computing devices, such as other mobile devices.

The mobile devices 12 illustrated in FIG. 1 operate as part of the wireless network system 10, for example, based on standards proposed by the Institute of Electrical and Electronic Engineers (IEEE), International Telecommunications Union-Telecommunication Standardization Sector (ITU), Internet Engineering Task Force (IETF), Wireless Application Protocol (WAP) Forum, Java Community, the American National Standard Institute (ANSI), or other proprietary standards.

Each mobile device 12 is coupled to a communication tower 13 via a wireless link, as illustrated in FIG. 1. In embodiments, each mobile device 12 is capable of communicating with the communication tower 13 using multiple frequency bands. A frequency band is a selected frequency range in the electromagnetic spectrum. Selected frequency bands are designated for use with wireless communications such as wireless telephony. In some cases, the mobile devices 12 may use frequency bands, frames, air-interface allocation units (slots), etc. specified by the WiMAX specifications. The communication tower 13 may be any wireless system that provides the air interface to mobile devices 12. Communication tower 13 includes a base transceiver station (BTS). Communication tower 13 may include transceivers, power amplifiers, combiners, duplexers, and antennas. Communication tower 13 may also include other components, such as a control function or control computer.

Mobile communication technology can use various standards and protocols to transmit data between a base transceiver station (BTS) of the communication tower 13 and a mobile device 12. A first mobile device 12, such as 12', may be using a first frequency band. A second mobile device 12, such as 12", may be using a second frequency band. The first mobile device 12' may be associated with a first wireless interface with the communication tower 13, while the second mobile device 12" may be associated with a second wireless interface with the communication tower 13. An alternative embodiment uses multiple communication towers, such as communication tower 13, that each communicate at one or more frequency bands. A wireless interface may correspond to an uplink communication from the mobile device 12 to the communication tower 13, or a downlink communication from the communication tower 13 to the mobile device 12.

Figure 2:
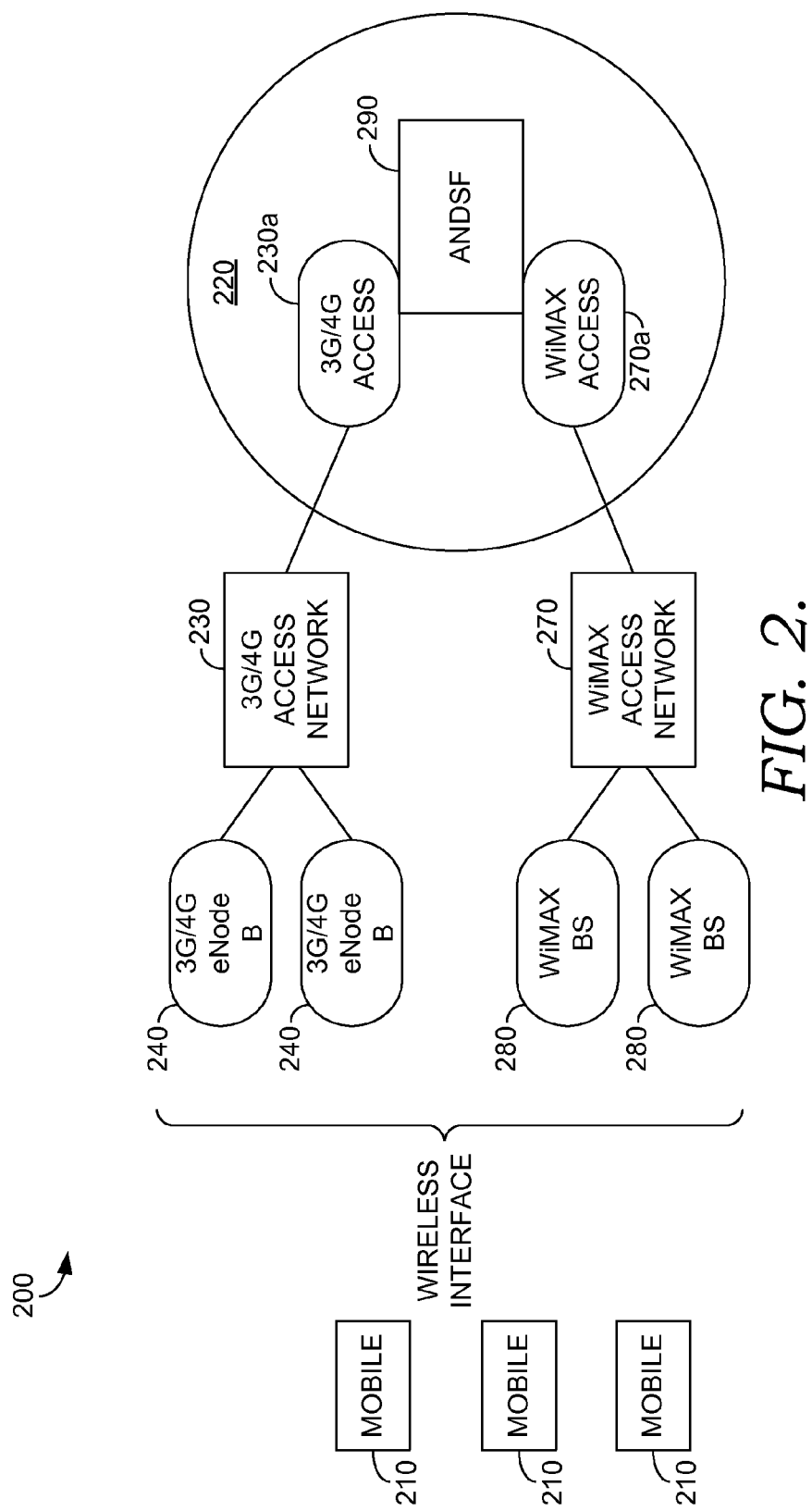
FIG. 2 is a network diagram of an exemplary communications system according to embodiments of the invention.

FIG. 2 is a network diagram of an exemplary communications system 200 according to embodiments of the invention. Communications system 200 illustrates multiple access networks in which one or more mobile devices, such as mobile devices 210 communicate with a core network 220. A first access network is illustrated as a 3G/4G access network 230. The mobile device 210 accesses the 3G/4G access network 230 through 3G/4G eNodeB 240 radio communications equipment. FIG. 2 illustrates that multiple eNodeBs 240 utilize the 3G/4G access network 230.

FIG. 2 also illustrates a WiMAX access network 270. The WiMAX access network 270 is accessed by the one or more mobile devices 210 through one or more WiMAX base stations (BS), such as WiMAX base stations 280. The 3G/4G access network 230 and the WiMAX access network 270 are just two non-limiting examples of access networks available for the mobile devices 210 to communicate with the core network 220. Other access networks are contemplated by embodiments of the invention.

Each access network includes one or more radio coverage cells, which are associated with the particular radio communication equipment used (3G/4G eNodeBs 240 and WiMAX base stations 280). Each radio coverage cell provides a radio interface to the mobile devices 210. Such an access network can include node elements, such as gateways, radio network controllers, etc. that support each cell.

The core network 220 provides functions such as mobility management, session management, user management, and roaming, to name just a few. Core network 220 supports multiple types of access networks and includes functions specific to a particular access network. As illustrated in FIG. 2, the core network 220 can support a 3G/4G access part of core network 230a and a WiMAX access part of core network 270a.

An Access Network Discovery and Selection Function (ANDSF) server 290 is also part of the core network 220. The ANDSF server 290 provides mobile devices, such as mobile devices 210, with policies and access network selection information within an access network. The ANDSF server 290 contains data management and control functionality necessary to provision network discovery and selection assistance data as per operators' policy. The ANDSF server 290 is able to initiate data transfer to the mobile devices 210 based on network triggers and respond to requests from the mobile devices 210. The ANDSF server 290 provides maintenance of the network, as well as network optimization. Such a server can also provide load sharing between the different networks, such as the 3G/4G access network 230 and the WiMAX access network 270.

A mobile device, such as a mobile device 210, contains an electronic serial number (ESN), which is assigned by a manufacturer at the time of manufacture. A list of ESNs for associated mobile devices 210 in a user subscription may be compiled by a base station manager and transmitted to the core network, such as core network 220. The ESN of a mobile device 210 can be screened by core network 220 when the mobile device 210 attempts to register.

A mobile device 210 also contains a Preferred Roaming List (PRL), which is assigned to the mobile device 210 by its carrier. The PRL of a mobile device 210 contains the primary communications carrier, along with other carriers that are working cooperatively with the primary communications carrier as part of a roaming agreement. The cooperative carriers provide communication services to the mobile device 210 when the primary communications carrier is either unavailable or overburdened at the time. The selection of a carrier is controlled by the core network 220. However, it is possible for a user of the mobile device 210 to override the core network 220 carrier selection process. For example, the user can add, delete, or change carriers within the mobile device 210 PRL. A user may elect to do this to obtain a better signal from another carrier, or obtain a different carrier from the core network 220 selected carrier. In another example, a wildcard PRL may also be available on the mobile device 210, which allows the user to accept any carrier onto its PRL. In yet another example, a user may also attempt to preclude other users from using a particular carrier, thereby squatting or hacking into that particular carrier's communications in an attempt to partially or completely overtake that carrier.

When a user overrides its PRL and selects a carrier, in some cases, the selected carrier might not be intended for public use and, as such, not operating at full capability. Such a carrier might be a newly formed or newly acquired carrier, or a carrier that is still in a test mode. This could result in less than acceptable communication services or lack of certain communication services to mobile devices 210 (e.g., emergency calls).

Embodiments of the invention control user manipulation of the mobile device 210 PRL, thereby minimizing the above situations from occurring. Channel access would be denied to an attempted fraudulent usage of a carrier, or an attempted access to a carrier that is not fully functional. In embodiments, channel access can be redirected (i.e., prevented or pushed to an appropriate carrier) when a mobile device 210 attempts to access a channel of a carrier outside of its stored PRL.

Figure 3:
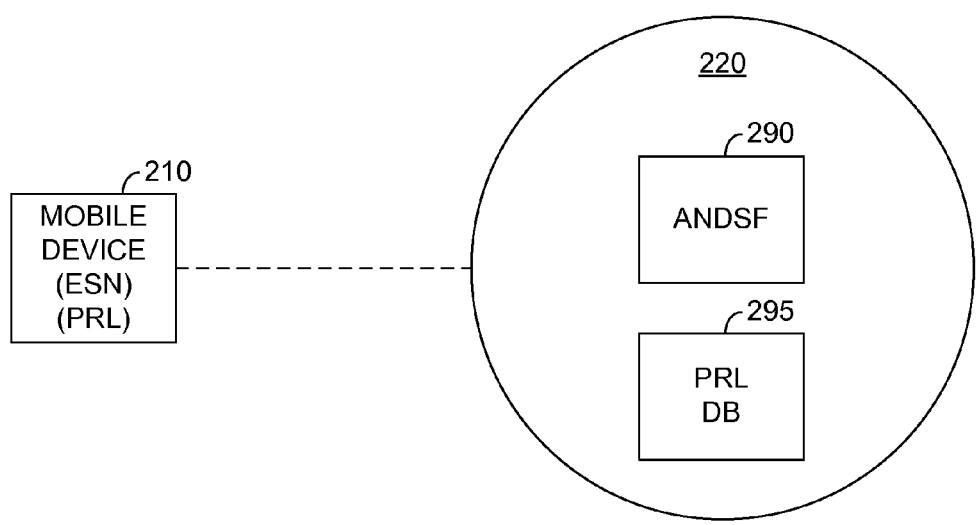
FIG. 3 is a network diagram that illustrates a core communications network according to embodiments of the invention.

FIG. 3 illustrates a mobile device 210 including an ESN and a PRL, and the core network 220 containing an ANDSF server 290. Other features of FIG. 2 have been omitted in FIG. 3 for the sake of clarity, but those features may be present. FIG. 3 also illustrates a PRL database 295 within the core network 220. PRL database 295 could reside separately from ANDSF server 290, as illustrated in FIG. 3, or PRL database 295 could be contained within ANDSF server 290.

Initially, the mobile device 210 utilizes a pilot channel to facilitate configuration setup. Such a pilot channel, or other similar channel, is a control channel used for signaling and configuration setup. In embodiments, the pilot channel is not utilized for voice or data transmission, for example, to a server or another mobile device 210. In configuring the mobile device 210, or during mobile device 210 setup, the PRL of the mobile device 210 is compared to the corresponding PRL within the PRL database 295. In this regard, the ANDSF server 290 can reference an ESN and/or PRL for the mobile device 210. Such an ESN and/or PRL may be transmitted to the ANDSF server 290 or retrieved by the ANDSF server 290, for example, during configuration. The ESN can be used to identify an appropriate PRL stored in the PRL database 295 associated with the mobile device 210. The identified PRL can then be compared to the PRL stored within the mobile device 210. Accordingly, in embodiments, such a PRL comparison occurs prior to mobile device 210 authentication to register with a wireless network, such as 3G, 4G, etc. That is, the PRL stored in the mobile device 210 is compared to the PRL stored at a server before a registration request is transmitted and, as such, before the mobile device 210 is connected with a cell tower, such as communication tower 13 of FIG. 1. The mobile device 210 PRL and database PRL can be compared at time of registration on power-up registration or during timer-based registration.

In some embodiments, the service provider can configure the ANDSF server 290 to regularly scan the mobile devices 210 and their associated PRL information stored in the PRL database 295, and to update and correct PRL information stored on the mobile devices 210. The update timers for mobile device 210 registrations, as well as the frequency of an ANDSF server 290 rescan, are configurable parameters in the core network 220. The mobile device 210 needs to be in an idle state during a rescan, so as not to interrupt an active session.

As discussed, the ANDSF server 290 can compare the PRL on the mobile device 210 to the corresponding stored PRL in the PRL database 295. If the mobile device 210 PRL does not match the stored PRL, then the mobile device 210 is not allocated a channel. Accordingly, the mobile device 210 is unable to register with the wireless access network. As a result, this mobile device 210 could reside on the network and have a signal, but would not have any radio frequency capability in which to communicate. If the mobile device 210 PRL does match the stored PRL, then a channel is allocated to the mobile device 210, at which point, communication is enabled. As such, the mobile device 210 can initiate registration with the wireless access network (e.g., via a registration request).

In some embodiments, the ANDSF server 290 has the capability to dictate PRL-related information stored on the mobile device 210. Accordingly, in some cases, the ANDSF server 290 can regularly scan the stored PRL of a mobile device 210 and update it to the correct PRL, according to the stored PRL in PRL database 295. In other cases, the ANDSF server 290 pushes the stored PRL from the PRL database 295 to the mobile device 210. Such a valid PRL can be pushed to the mobile device 210, for example, when a determination is made that the PRL stored on the mobile device 210 does not match the corresponding PRL stored in the PRL database 295. When the mobile device 210 re-boots (or at another time), the mobile device 210 would contain the new PRL. In effect, this prevents the mobile device 210 from using an unauthorized wireless network or from using a wireless network to an extent greater than intended (e.g., via a service agreement.) In yet another embodiment, the ANDSF server 290 removes a wildcard PRL option on the mobile device 210 by implementing a "constant deny" instruction. As previously discussed, the wildcard PRL permits the inclusion of any carrier onto the mobile device 210 PRL.

Using embodiments of the invention, a mobile device 210 attempting unauthorized use of a wireless access network (e.g., 3G or 4G) will not be given a channel, i.e. will not have the radio frequency capability to communicate. If the mobile device 210 is attempting to perform mobile device setup or configuration with an altered or modified PRL, then no channel will be assigned. In a further embodiment, the ANDSF server 290 pushes the correctly stored PRL from the PRL database 295 to the mobile device 210, such that the mobile device 210 is forced to initiate registration with an appropriate wireless network.

By way of example only, assume that a user of the mobile device 210 has altered the PRL contained within the mobile device 210. For instance, a user that is a subscribing customer of a primary communications carrier may alter the PRL to establish access or utilization of a roaming partner only. In another example, a user may alter the PRL to access or use a new network. Now assume that device configuration or setup is initiated for a mobile device 210. Upon comparing the altered mobile device 210 PRL to a corresponding PRL stored, for example, at a server of the subscribing network, a determination of the altered PRL can be made. As such, the mobile device 210 can be prevented from obtaining a channel for voice and/or data communication with another device, such as a server or another mobile device 210. Additionally or alternatively, based on the altered PRL, an appropriate PRL can be provided to the mobile device 210 such that the mobile device 210 is, in effect, guided to utilize an appropriate network. A Mobile Switching Center (MSC) of a network can update a Visitors' Location Register (VLR) for the mobile device 210 to indicate that a connection is denied, until an appropriate PRL is detected. This could occur after a "push" update of the PRL. This would force a re-registration when the PRL was updated, which would also trigger the VLR to be updated.

Figure 4:
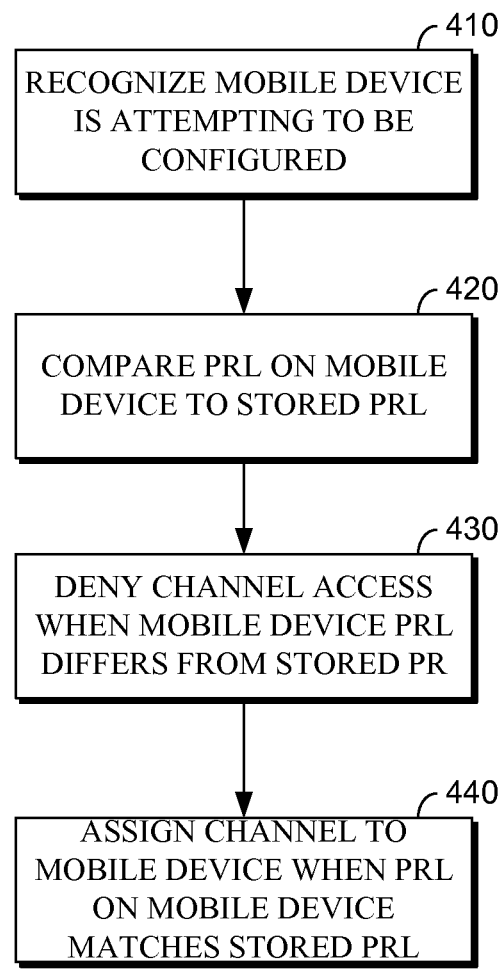
FIG. 4 is a flow diagram illustrating a computer-implemented method of controlling channel access according to embodiments of the invention.

FIG. 4 is a flow diagram illustrating a computer-implemented method of controlling channel access to a mobile device that is being configured or establishing setup. In step 410, it is recognized that a mobile device, such as mobile device 210 of FIG. 3, is attempting to be configured. For instance, the mobile device 210 has received a signal from the network and is attempting to access a channel by which to communicate.

Each mobile device 210 has an ESN that was assigned during manufacture. Each mobile device 210 also has a PRL that was assigned by its carrier. The PRL lists the mobile device 210 primary carrier, as well as secondary carriers that are part of a roaming agreement with the primary carrier. In embodiments, the PRL indicates which bands, sub bands and service provider identifiers will be scanned and in the appropriate priority order. The core network, such as core network 220, has a PRL stored on a PRL database, such as PRL database 295. In step 420, the PRL on the mobile device 210 is compared to the stored PRL in the PRL database 295. The ESN can be used to identify the appropriate PRL stored in the PRL database 295. In embodiments, the PRL and/or the ESN of the mobile device 210 can be sent to the ANDSF server 290 of the core network 220 to facilitate the comparison of the PRL stored on the mobile device 210 and the corresponding PRL stored in the PRL database 295. The PRL database 295 may contain identifying information for mobile devices 210 belonging to compatible carriers. For example, a mobile device 210 that is trying to roam onto a network from a non-cooperative network could be pushed back to the appropriate non-cooperative network.

If the PRL on the mobile device 210 does not match the corresponding stored PRL in the PRL database 295 (e.g., the PRL designated for the mobile device 210), then channel access is denied to the mobile device 210 in step 430. The mobile device 210 PRL can differ from the stored PRL for a number of reasons. For instance, a mobile device 210 may have a wildcard PRL option, which allows the mobile device to add any carrier. This provides a larger pool of available carriers. In another example, a user of the mobile device 210 may recognize a "better" signal of another carrier that is different from the carrier selected by the network. Therefore, a user may select that carrier, either on an individual case or select it for communication most or all of the time. Even though the selected carrier may be an approved roaming partner of the subscribed-to network, selection of the carrier by altering the PRL may be unauthorized because the roaming partner is not to be used in such capacity (e.g., the subscribed-to network is available for communication). Accordingly, such a modification of the PRL at the mobile device 210 can be described as an unauthorized PRL alteration or modification.

In an embodiment, the stored PRL can be pushed to the mobile device 210 by the ANDSF server 290. When the mobile device 210 reboots, the new PRL will be implemented onto the mobile device 210. This re-directs the mobile device 210 to the network-designated PRL. The ANDSF server 290 can also scan mobile devices 210 on a particular timetable to check for correct mobile device 210 PRLs.

Another situation in which the mobile device 210 PRL may differ from the stored PRL is during a takeover attempt of a particular carrier. Certain users may take the identities of other mobile devices 210 in order to occupy a large communication capacity, thereby precluding other users from legitimately using that carrier. Embodiments of the invention deny access of a channel to mobile devices 210 attempting to squat or hack into a particular carrier by verifying a matching mobile device 210 PRL to a stored PRL, prior to assigning the channel.

If a mobile device 210 PRL matches the stored PRL in the PRL database 295, then a channel is assigned to the mobile device 210 in step 440. Embodiments of the above-described method of controlling channel access provides a communications network in which a communication channel (e.g., a bearer channel used for communicating voice and/or data) is not assigned until it has been determined that the mobile device 210 PRL matches the stored PRL. This provides a tighter control of carrier assignment by the network.

Figure 5:
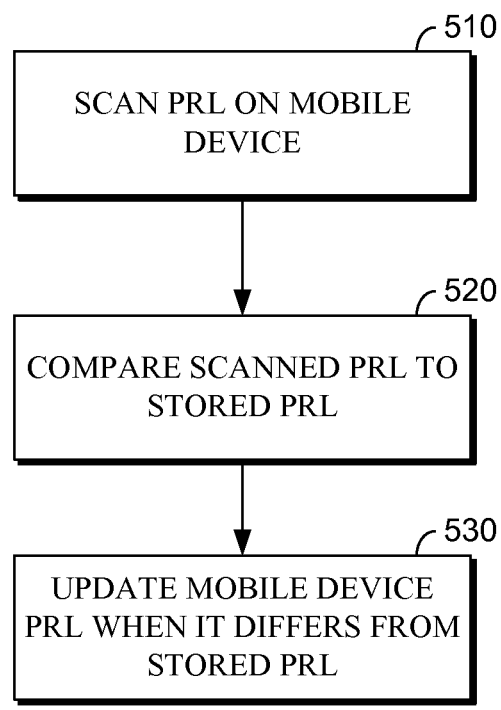
FIG. 5 is a flow diagram illustrating a method of regulating a PRL according to embodiments of the invention.

FIG. 5 is a flow diagram illustrating a method of regulating a PRL. A PRL of a mobile device, such as the mobile device 210 of FIG. 3, is scanned by an ANDSF server, such as ANDSF server 290 of FIG. 3, in step 510. The scanning may occur as a result of a regularly scheduled scan, or it could be the result of a mobile device 210 attempting to access a channel for communication. The scanned PRL is compared to the PRL stored in a PRL database, such as PRL database 295, in step 520. If the scanned PRL of the mobile device 210 differs from the stored PRL, then the mobile device 210 PRL is updated in step 530. In embodiments, the comparing of step 520 and the updating of step 530 are implemented by the ANDSF server 290.

A difference in PRLs between the mobile device 210 and the PRL database 295 may be the result of a user attempting to override the existing PRL on the mobile device 210 and register with a carrier that is different from a network-selected carrier. Channel access is denied to a mobile device 210 when the mobile device 210 PRL differs from the stored PRL. In an embodiment, the mobile device 210 would be updated to match the stored PRL in this situation. In another embodiment, a wildcard PRL would essentially be deactivated on the mobile device 210, which would restrict the mobile device 210 to selected carriers, such as cooperative carriers under a roaming agreement. When a mobile device 210 has a wild-carded PRL, it makes all PRLs valid. Embodiments of the invention would eliminate the ability to wildcard a PRL unless the PRL database 295 has that particular wildcard PRL. Therefore, any wild-carded PRLs would be rendered ineffective, if the mobile device 210 PRL is not in the PRL database 295.

Many different arrangements of the various components depicted, as well as components not shown, are possible without departing from the spirit and scope of the several embodiments of the invention. Embodiments of the invention have been described with the intent to be illustrative rather than restrictive.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method of controlling channel access to a mobile device for communication via a wireless network, the computer-implemented method comprising:
based on a configuration with a communication tower being initiated for the mobile device, and prior to granting the mobile device channel access at the communication tower, determining, based on the electronic serial number (ESN) of the mobile device, whether the mobile device has a subscription to the wireless network;
when a determination is made that the mobile device has a subscription to the wireless network, then prior to granting the mobile device channel access at the communication tower, comparing a preferred roaming list (PRL) on the mobile device to a centrally stored PRL for the mobile device, wherein the stored PRL is identified based on the ESN of the mobile device;
denying a channel access to the mobile device at the communication tower and updating the PRL on the mobile device when the PRL on the mobile device does not match the stored PRL; and
assigning a channel to the mobile device for mobile device communication when the PRL on the mobile device matches the stored PRL.

2. The computer-implemented method of claim 1, further comprising:
pushing the stored PRL to the mobile device, via an Access Network Discovery and Selection Function (ANDSF) server, when the PRL on the mobile device differs from the stored PRL for the mobile device.

3. The computer-implemented method of claim 1, wherein a user of the mobile device comprises a hacker or squatter.

4. The computer-implemented method of claim 1, wherein the PRL on the mobile device has been changed to register with a specific carrier.

5. The computer-implemented method of claim 1, wherein the denying a channel access inactivates a wildcard PRL on the mobile device.

6. A communications system for controlling mobile device channel access, comprising:
a mobile device having an ESN and a Preferred Roaming List (PRL) stored therein;
one or more radio communication equipments;
one or more access networks; and
a core network comprising an Access Network Discovery and Selection Function (ANDSF) server and a Preferred Roaming List (PRL) database, the ANDSF server determining, upon the mobile device attempting to access a communication channel of the access network, after a determination is made that the mobile device is subscribed with the access network and prior to granting the mobile device access to the communication channel of the access network, whether the PRL stored within the mobile device matches a corresponding PRL within the PRL database based on a comparison of the PRLs and permitting access to the communication channel of the access network in accordance therewith, and updating the PRL stored within the mobile device when the PRL stored within the mobile device does not match the corresponding PRL within the PRL database, wherein the corresponding PRL within the PRL database is identified based on the ESN of the mobile device.

7. The communications system of claim 6, wherein channel access is granted to the mobile device when the PRL of the mobile device matches the stored PRL for the mobile device in the PRL database.

8. The communications system of claim 6, wherein channel access is not granted to the mobile device when the PRL of the mobile device does not match the stored PRL for the mobile device in the PRL database.

9. The communications system of claim 6, wherein the ANDSF server renders a wildcard PRL ineffective on each of the one or more mobile devices.

10. One or more non-transitory computer-readable storage media storing computer-readable instructions thereon, that when executed by a computing device, perform a method of regulating Preferred Roaming Lists (PRLs), comprising:
determining that a mobile device is attempting to access a channel at a base station associated with a carrier, wherein the mobile device has an electronic serial number (ESN);
prior to granting the mobile device channel access at the base station, utilizing the ESN of the mobile device to access a central database that stores ESNs of mobile devices that are subscribed with the carrier, wherein accessing the central database includes determining whether the mobile device is subscribed with the carrier;
when a determination is made that the mobile device is subscribed with the carrier, then prior to granting the mobile device channel access at the base station, scanning a Preferred Roaming List(s) stored on the mobile device;
comparing the scanned PRL on the mobile device to a network-stored PRL for the mobile device; and
when the PRL on the mobile device differs from the network-stored PRL for the mobile device, then
a) denying the mobile device channel access at the base station, and
b) updating the PRL on the mobile device when it differs from the network-stored PRL for the mobile device.

11. The one or more non-transitory computer-readable storage media of claim 10, wherein the scanning occurs on a regularly scheduled basis.

12. The one or more non-transitory computer-readable storage media of claim 10, wherein the updating occurs when the mobile device attempts to register with a carrier that is not on the network stored PRL.

13. The one or more non-transitory computer-readable storage media of claim 10, wherein the scanning, comparing, and updating are implemented via an Access Network Discovery and Selection Function (ANDSF) server.

14. The one or more non-transitory computer-readable storage media of claim 10, wherein the network stored PRL is located in a core network PRL database.

15. The one or more non-transitory computer-readable storage media of claim 10, wherein the updating occurs when the mobile device has been modified from a carrier-assigned PRL of the mobile device.

16. The one or more non-transitory computer-readable storage media of claim 10, wherein the comparing removes a wildcard PRL option on the mobile device.

* * * * *